March 8, 1927. 1,619,815
C. H. FOSTER
SHOCK ABSORBER
Filed April 30, 1926  3 Sheets-Sheet 1
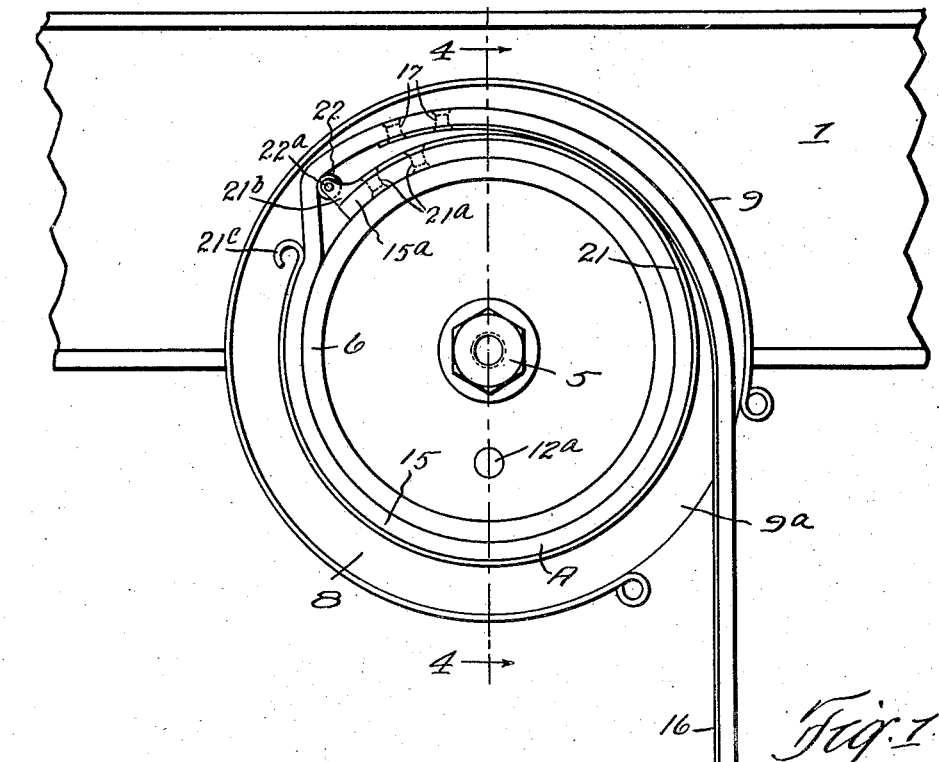
Fig. 1
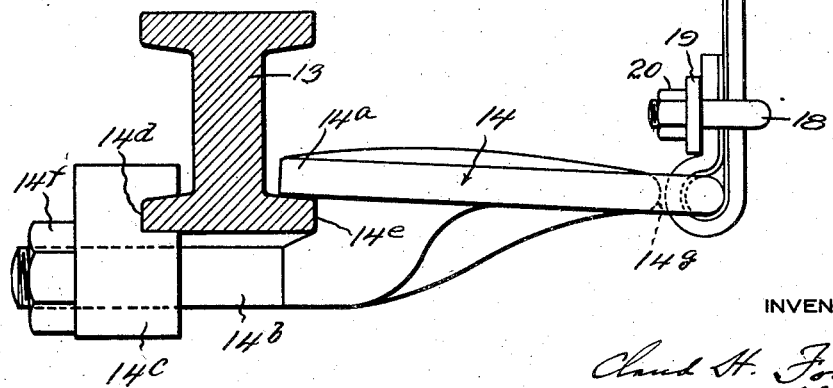
INVENTOR
Claud H. Foster
By Hull, Brock & West
Attys.

March 8, 1927.
C. H. FOSTER
SHOCK ABSORBER
Filed April 30, 1926      3 Sheets-Sheet 2
1,619,815
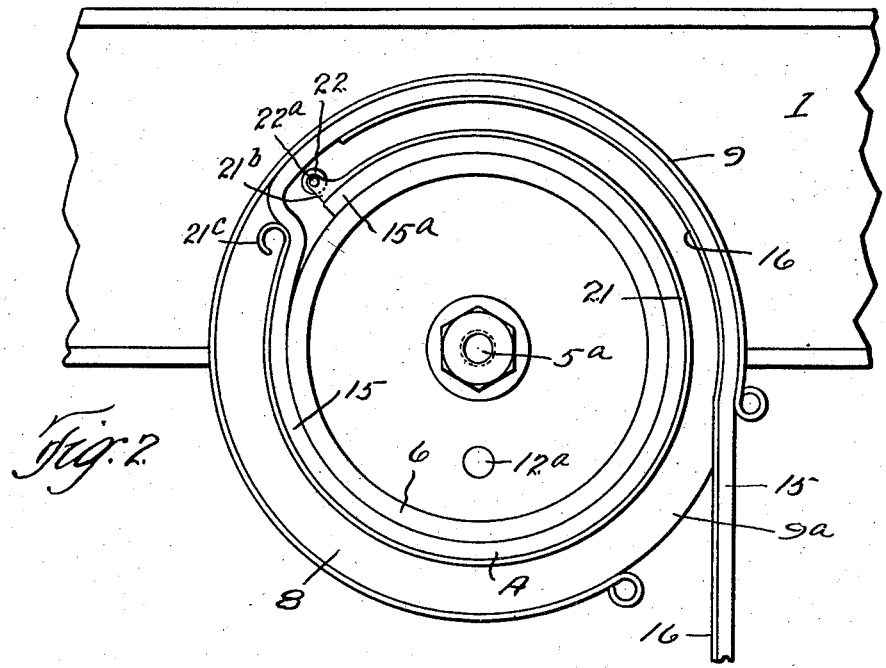
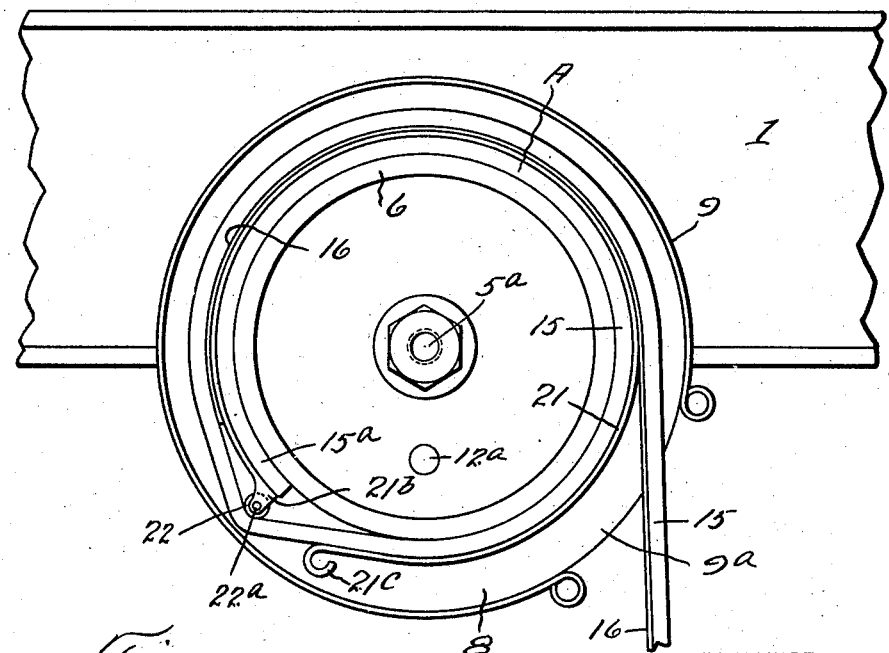
INVENTOR March 8, 1927.
C. H. FOSTER
1,619,815
SHOCK ABSORBER
Filed April 30, 1926      3 Sheets-Sheet 3
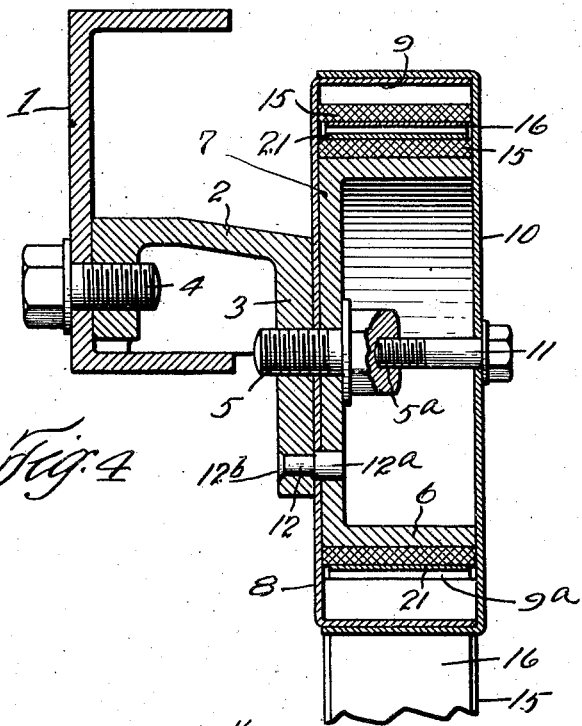
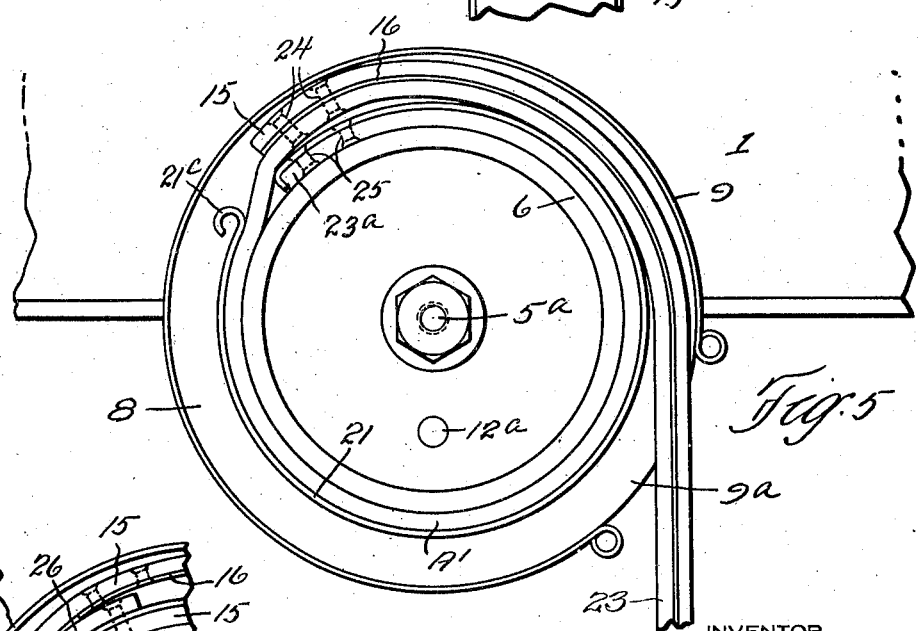
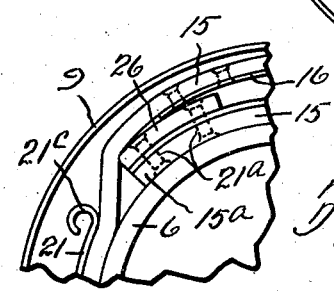
INVENTOR Patented Mar. 8, 1927.

1,619,815

UNITED STATES PATENT OFFICE.

CLAUD H. FOSTER, OF WICKLIFFE, OHIO.

SHOCK ABSORBER.

Application filed April 30, 1926. Serial No. 105,621.

This invention relates to shock-absorbing devices such as are interposed between the axles and frames of vehicles for the purpose of reducing the extent of vibration or relative movement of such parts, whereby excessive movement of and injury to the springs of such vehicles is prevented and the comfort of the occupants of the vehicles is enchanced.
Among the general objects of the invention are the following:—to provide a device of this character which can be produced at low cost; which is simple of construction; which is capable of quick and convenient application to and removal from the parts with which it is associated; which can be conveniently adjusted; and which is efficient in operation.

I realize the foregoing advantages in and through a construction of shock absorber in which the braking action of a flexible band upon a drum is secured, but without the necessity for employing a spring for the purpose for resisting or assisting to resist the separation of the axle and frame during the upward or rebound movements of the frame, or of restoring or resetting the band or strap to its initial position upon the drum as the axle and frame approach each other.
The present preferred embodiments of my invention are shown in the drawings forming part hereof, wherein Fig. 1 represents a front elevation of my shock absorbing device with the cover removed, showing the said device connected to a vehicle frame and axle, the positions of the parts being those which they assume under ordinary riding conditions; Fig. 2 a view similar to Fig. 1, the axle being omitted and showing the positions of the parts when the frame and axle approach each other a distance insufficient to cause a movement of the brake band and associated parts upon the drum; Fig. 3 a view similar to Fig. 2 and showing the positions of the parts after the brake band has been moved about the drum by the approach of the frame to the axle and the frame and axle have started to separate, thereby gripping the brake band upon the drum; Fig. 4 a sectional view corresponding to the line 4—4 of Fig. 1; Fig. 5 a view, similar to Fig. 1, showing a modified form of my invention; and Fig. 6 a detail in front elevation showing another modification of my invention.

Describing the various parts by reference characters, 1 denotes one of the side members of a vehicle frame, such member being shown as of the ordinary channel construction. Secured to the member 1 is an angular bracket 2, 3, one or more bolts 4 connecting the part 2 of the bracket to the said member. Secured to the depending branch 3 of the bracket, by a bolt 5, is a brake drum the cylindrical wall of which is indicated at 6. The bottom or inner wall 7 is provided with a central aperture for the bolt 5. The drum is provided with a single head 7, the outer end of the drum being open. Between the head 7 and the depending flange 3 of the angular bracket is inserted the bottom wall or head 8 of a housing, preferably of sheet metal, the said housing having a cylindrical wall 9 and an outer head or cover 10 which is shown as secured in place across the open end of the drum by means of a bolt 11 having the inner end threaded into a central aperture $5^a$ in the head of the bolt 5. For the purpose of preventing the drum from rotating about the bolts 5 and 11, an eccentrically located stud 12 is provided, which is shown as having a head $12^a$ at one end adapted to enter a corresponding aperture in the head 7 of the drum, the opposite end of the stud being shown as expanded or riveted to the vertical flange 3 of the angle bracket, as shown at $12^b$.

13 indicates the axle, which may be of the ordinary I-beam type. Secured to this axle is an arm 14, the said arm having a flange $14^a$ adapted to engage the top of the bottom flange at one side of the I-beam and with a threaded stem $14^b$ on which is mounted a clamp $14^c$ having a notched seat $14^d$ adapted to engage the opposite bottom flange of the axle. The arm 14 is clamped securely to the axle by means of the flange $14^a$ and the notch $14^e$ therebeneath and by the clamp $14^c$, the clamp being forced toward the notched seat $14^e$ by a nut $14^f$ threaded on the end of the stem $14^b$. The end of the arm 14 opposite the stud $14^b$ is provided with a slot $14^g$ by means of which one end of a strap is secured to said arm, and, through said arm, to the axle 13. The strap shown herein is a composite strap, consisting of an outer member 15 of pliable material, preferably woven belting. This member extends upwardly through a slot $9^a$ in the housing and extends entirely about the drum 6, forming a brake band A for said drum. The inner member 16 of the said composite strap is preferably a band of spring brass and extends upwardly within the housing 9 and between the same and the drum 6, being fastened at its upper and inner end to the member 15, as by means of rivets 17, preferably at a point beyond a vertical plane extending through the center of the drum. The lower ends of the members 15 and 16 are passed through the slot 14ᵍ and are clamped against the bodies of said strap members by means of a U-bolt 18, a bearing plate 19, and nuts 20.

Secured to the outer face of the upper or inner end 15ᵃ of the brake band A is a spring metal band 21, this band being preferably of thin steel. The band 21 is shown as secured to the brake band by means of rivets 21ᵃ; and the inner or upper end of the band 21 is provided with a pair of ears 21ᵇ, one at each side thereof, which receive the opposite ends of a shaft 22ᵃ for a roller 22. The band 21 extends about the outer surface of the brake band A to a point adjacent to but spaced from the end 15ᵃ of said brake band, where the said band 21 is bent outwardly into a looped form, as indicated at 21ᶜ.

With the parts constructed and arranged as described, the operation will be as follows, it being understood that when the parts are in the positions shown in Fig. 1, the vehicle body and axle are in the relative positions which they occupy under ordinary running conditions on smooth roads.

During movements of small amplitude of the body and axle toward and from each other, there will be no rotation of the brake band A about said drum. As the axle moves upwardly, the composite strap 15, 16, will be moved upwardly, but the clearance between it and the housing 9 will allow movements of the axle and frame, sufficient to accommodate small irregularities in the road bed, without rotating the brake band A formed by looping the strap member 15 about the drum. There will be a certain range of movement, predetermined by the clearance between the composite strap 15, 16 and the housing 9 on the one side, and between such part of the composite strap and the loop or band A on the other side, which will accommodate such movements or vibrations as may be readily absorbed by the tires and vehicle springs without rotating the brake band, there being a larger clearance in the case of vehicles equipped with balloon tires than in the case of vehicles equipped with the ordinary high-pressure tires. When, however, a more severe obstruction is encountered, the composite strap 15, 16 will act in the manner shown in Figs. 2 and 3, the strap member 15 engaging the inner surface of the housing 9 and following around such surface in a counter-clockwise direction. When this movement of the composite strap exceeds that shown in Fig. 2, the thrust exerted against the looped end 21ᶜ of the spring band 21 relieves somewhat the grip of the said band upon the part of the strap 15 looped about the drum and constituting the brake band A, and this thrust will rotate the brake band in a counter-clockwise direction.

In Fig. 3, the loop forming the brake band A is shown as having been rotated a considerable distance, corresponding to a considerable movement of the axle and vehicle frame toward each other. Upon the reverse movement of the axle, following such upward movement, the composite strap 15, 16 will be drawn downwardly, taking in the slack thereof, and, through the roller 22, pulling the upper end 15ᵃ of the strap member 15 tightly against the drum 6. Evidently, the more rapidly the frame and axle separate, the more quickly will the pull be exerted by the outer surrounding parts of the strap 15, 16 upon the part of the brake band interposed between such parts and the drum 6, with a quicker and severer application of the brake band to the drum. In other words, the harder and quicker the downward jerk upon the strap 15, 16, the greater will be the friction which is exerted by the brake band upon the brake drum and the quicker will this braking action be exerted. It will be seen that the braking action is in proportion to the quickness and the extent of the separation between the axle and the frame.

The roller 22 acts in its customary manner to reduce, within small limits of movement, the friction between the strap member 15 and the part 15ᵃ therebeneath. It also insures a quickness of gripping action between the brake band or loop and the drum when the slack of the strap 15, 16 is taken in. It has the further advantage of cutting down or reducing any noise or chatter, due to the operation of the brake, which would be transmitted by the frame to the body of the vehicle.

It will be noted that the member 15 is of greater width than the spring metal bands 16 and 21, the said bands being spaced from and maintained out of contact with the front and back walls of the housing.

In Fig. 5 there is shown a modification of my invention, wherein the composite strap consists not only of the parts 15 and 16, but also of an inner strap member 23, preferably of the same kind of material as the member 16, the member 23 being extended about the drum 6 to form the loop or brake band A′ and being connected to the members 15 and 16 by rivets 24 at a point approximately above the inner end of the brake band or loop. The spring band 21 in this case is connected to the upper inner end 23ᵃ of the member 23 by rivets 25.

The operation of this form of my invention will be similar to that of the form shown in the preceding views. The parts in Fig. 5 are shown in the positions which they occupy in taking care of movements between the vehicle frame and axle of insufficient amplitude to cause a rotation of the brake band or loop A′ in a counter-clockwise direction about the drum 6, the band 16 serving at this time to stiffen the strap members 15 and 23 to an extent to allow the composite strap to operate, in the manner described hereinbefore in connection with the earlier embodiment of my invention, without rotating the brake band or loop. When, however, one or more of the tires encounters a severe obstruction, the movement of the axle toward the frame will be sufficient to cause the strap 15, 16, 23 to rotate the brake band or loop in a counter-clockwise direction upon the drum; upon the succeeding reverse movement between the axle and frame, the composite strap will be tightened as described hereinbefore and will cause the brake band A′ to exercise a braking action upon the drum.

In this form of my invention, the use of woven or fabric straps on each side of the metal band 16 prevents any chattering of metal on metal, thereby cutting out the transmission of noises to the interior of the vehicle body.

In Fig. 6, there is shown a still further modification of the invention wherein, in lieu of providing the inner and upper end 15ª of the loop or brake band with a roller carried by the corresponding end of the band 21, I have secured to such ends of the members 15 and 21 a short length 26 of material which will increase the thickness of the parts and will prevent any chattering of metal on metal. For this purpose, the member 26 may be made of the same sort of fabric as the member 15, or of rubber, or other suitable material. This increasing of the thickness of the inner end 15ª of the brake band or loop also causes a quicker gripping action between this part of the same and the drum therebeneath, through the action thereon of the strap members 15 and 16 upon rebound of the vehicle frame and axle.

In all the forms of my invention disclosed herein, there is a strap which is formed at its inner end into a loop which constitutes a brake band, the brake band being an extension of the strap, which is secured at one end to the vehicle member, and the strap being capable of rotating the brake band freely upon the drum in one direction and of rotating it under gripping friction in the opposite direction when the vehicle frame and axle separate. The spring band 21 normally holds the brake band in such engagement with the drum that the band will not be rotated in a counter-clockwise movement until the composite strap 15 and 16 is in approximately the position shown in Fig. 2, at which time the grip of the said band is sufficiently relaxed by the action of the member 15 against the looped end thereof to permit the rotation of the brake band in the direction referred to.

Having thus described my invention, what I claim is:

1. In a shock absorber, the combination, with a drum, of a strap having its inner end formed into a loop constituting a brake band extending partly about the drum and rotatable thereupon, with an operating portion of the strap surrounding such end of the band and the drum-engaging portion thereof adjacent thereto, and means whereby the thrust of the operating part of the strap will be transmitted through the loop to the inner end of the brake band, thereby to rotate the band freely upon the drum, the inner end portion of the band being provided with a projection adapted to be engaged by the operating portion of the strap exterior thereto when the strap is subjected to a pull, thereby to force such end of the brake band against the drum and cause the band to exert a braking action through the pull exerted upon the strap.

2. In a shock absorber, the combination, with a drum, of a strap having its inner end formed into a loop constituting a brake band extending partly about the drum and rotatable thereupon, with an operating portion of the strap surrounding such end of the band and the drum-engaging portion thereof adjacent thereto, and means whereby the thrust of the operating part of the strap will be transmitted through the loop to the inner end of the brake band, thereby to rotate the band freely upon the drum, the operating portion of the strap being arranged to engage the end portion of the band, when the strap is subjected to a pull, thereby to force such end portion of the brake band against the drum and cause the band to exert a braking action through the pull so exerted upon the strap.

3. In a shock absorber, the combination, with a drum, of a strap member having a portion formed into a loop and constituting a brake band extending nearly around said drum, the strap member extending outside of and around the end portion of said loop, a spring band on the outer surface of such brake-band and extending about such brake band with an end adjacent to but spaced from the end of the brake band, and a flexible metal strap member operatively connected with the part of the first mentioned strap member which extends about the brake band.

4. In a shock absorber, the combination of a drum, a strap having one end on said drum and formed into a loop extending partly about the drum, with an operating portion extending about such end portion, a spring band upon the outer surface of the said loop, and means whereby movement of the operating part of said strap in one direction will rotate the loop freely upon said drum and movement of such operating part in the opposite direction will cause such part to force said loop into engagement with the drum.

5. In a shock absorber, the combination of a drum, a strap comprising a member having its inner end mounted upon the drum and formed into a loop constituting a brake band extending partly about the drum, with the operating portion of the strap surrounding such end of the strap member and the portion of the brake band adjacent thereto, and means whereby the thrust of the operating part of the strap will be transmitted through the brake band to the end of the same, thereby to rotate the band freely upon the drum and whereby a pull upon the operating part of the strap will tighten the band upon the drum.

6. In a shock absorber, the combination of a drum, a housing for said drum spaced therefrom, a strap member entering said housing and looped about said drum and having a portion interposed between such loop and the housing, a spring metal strap secured at one end to the inner end of said strap member and extending about the looped portion of such member, with its opposite end adjacent to but spaced from such inner end, and a spring metal strap member connected to the operating part of the first mentioned strap member and imparting sufficient rigidity thereto to cause the loop to be rotated upon the drum when the operating portion of the strap shall have engaged the part of the housing adjacent thereto.

7. In a shock absorber, the combination of a drum, a housing for said drum spaced therefrom, a strap member entering said housing and looped about said drum and having a portion interposed between such loop and the housing, a spring metal band surrounding the looped portion of such member, with one end adjacent to but spaced from the inner end of said strap-member, the strap being flexible but possessing sufficient rigidity to cause the loop to be rotated upon the drum when the operating portion of the strap shall have engaged the part of the housing adjacent thereto.

8. The combination, with a vehicle frame member and an axle member, of a shock absorber comprising a drum secured to one of said members, a housing for said drum, a strap secured to the other vehicle member and extending into the housing and formed into a loop, with a portion of said strap interposed between the end portion of said strap within said housing, and the drum, a spring band secured at one end to the end portion of said strap within the housing and extending about the outer surface of the loop with its other end adjacent to and spaced from such end portion of said strap, there being a projection on such end portion of said strap which is adapted to be engaged by a portion of the strap interposed between such end portion and the housing, the portion of the strap which extends from such other vehicle member to a point adjacent the end of the loop being of flexible material but possessing sufficient rigidity to move the loop about the drum, through engagement of the strap with the housing.

9. In a shock absorber, the combination of a drum, a housing surrounding said drum, a strap looped about said drum and having an operating part extending about its inner end on said drum and between a portion of such loop and the housing, a spring metal band secured at one end to the inner end of the strap and extending about the looped portion of such strap, with its opposite end adjacent to but spaced from the inner end of such strap, the inner end of the strap having a projection extending toward the housing against which the operating part of the said strap is adapted to bear, the operating portion of the strap being of flexible material but possessing sufficient rigidity to move the loop about the drum when a sufficient thrust is exerted against such operating portion to cause it to engage the housing.

10. In a shock absorber, the combination of a drum, a housing surrounding said drum, a strap looped about said drum and having an operating part extending about its inner end on said drum and between a portion of such loop and the housing, means holding the said loop against the said drum, the operating portion of the strap being of flexible material but possessing sufficient rigidity to move the loop about the drum when a sufficient thrust is exerted against such operating portion to cause it to engage the housing.

11. In a shock absorber, the combination of a drum, a housing for said drum, a strap secured to the other vehicle member and extending into the housing and formed into a loop, with a portion of said strap interposed between the end portion of said strap, within said housing, and the drum, means for holding said loop against said drum, the said strap being of flexible material but possessing sufficient rigidity to thrust the loop about the drum, through engagement of the strap with the housing, the thrust of the strap serving to diminish the action of such holding means.

12. In a shock absorber, the combination of a drum, a strap member having one end on said drum and formed into a loop extending about a portion of the drum with an operating portion extending about such end portion, means whereby the thrust of the operating part of said strap member in one direction will rotate the loop freely in such direction upon said drum, and a projection on the end portion of said loop adapted to be engaged by the operating portion of said strap member when the latter is pulled in the opposite direction.

In testimony whereof, I hereunto affix my signature.

CLAUD H. FOSTER.